United States Patent
Showa et al.

(10) Patent No.: US 11,456,012 B1
(45) Date of Patent: Sep. 27, 2022

(54) BASE MEMBER, SPINDLE MOTOR, AND HARD DISK DRIVE DEVICE

(71) Applicant: MINEBEA MITSUMI Inc., Nagano (JP)

(72) Inventors: Hideaki Showa, Nagano (JP); Kenichi Kojima, Tomi (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/649,964

(22) Filed: Feb. 4, 2022

(30) Foreign Application Priority Data

Jun. 18, 2021 (JP) .............................. JP2021-101499

(51) Int. Cl.
*G11B 19/20* (2006.01)
*G11B 33/02* (2006.01)
*G11B 25/04* (2006.01)

(52) U.S. Cl.
CPC ........ *G11B 19/2009* (2013.01); *G11B 33/022* (2013.01); *G11B 25/043* (2013.01)

(58) Field of Classification Search
None
See application file for complete search history.

(56) References Cited

U.S. PATENT DOCUMENTS

| 7,957,092 | B2 | 6/2011 | Ichikawa et al. |
| 9,330,728 | B1 | 5/2016 | Nakamura et al. |
| 9,336,817 | B1 | 5/2016 | Hirasawa |
| 9,613,650 | B2 | 4/2017 | Yawata et al. |
| 9,837,113 | B2 * | 12/2017 | Takemoto .......... G11B 19/2009 |
| 10,102,882 | B1 | 10/2018 | Ino |

(Continued)

FOREIGN PATENT DOCUMENTS

| JP | 2008-165951 A | 7/2008 |
| JP | 2011-099518 A | 5/2011 |

(Continued)

OTHER PUBLICATIONS

Decision to Grant dated Jul. 8, 2021 for corresponding Japanese Application No. 2021-101499 and English translation.

*Primary Examiner* — Carlos Garcia
(74) *Attorney, Agent, or Firm* — Pearne & Gordon LLP

(57) ABSTRACT

A base member of a spindle motor includes an upper surface and a lower surface, in which the base member is a casting, the upper surface includes a pin portion extending upward, the lower surface includes a first lower surface and a second lower surface positioned higher than the first lower surface, and the first lower surface and the second lower surface are adjacent to each other with a stepped portion interposed between the first lower surface and the second lower surface, the stepped portion increasing in height from the first lower surface to the second lower surface. The stepped portion has a uniform height difference, and when a tangential line is drawn to the stepped portion in a cross section passing through a central axis of the pin portion and extending perpendicular to the stepped portion in plan view, the tangential line extends through between a lower edge point of an outer periphery of the pin portion on a side of the second lower surface and a lower edge point of the outer periphery of the pin portion on a side of the first lower surface.

11 Claims, 10 Drawing Sheets

(56) References Cited

U.S. PATENT DOCUMENTS

2008/0165448 A1    7/2008   Ichikawa et al.
2016/0163349 A1    6/2016   Yawata et al.
2016/0365105 A1   12/2016   Kimura et al.

FOREIGN PATENT DOCUMENTS

| | | |
|---|---|---|
| JP | 2016-110675 A | 6/2016 |
| JP | 2016-170843 A | 9/2016 |
| JP | 2016-171717 A | 9/2016 |
| JP | 2019-008856 A | 1/2019 |

* cited by examiner

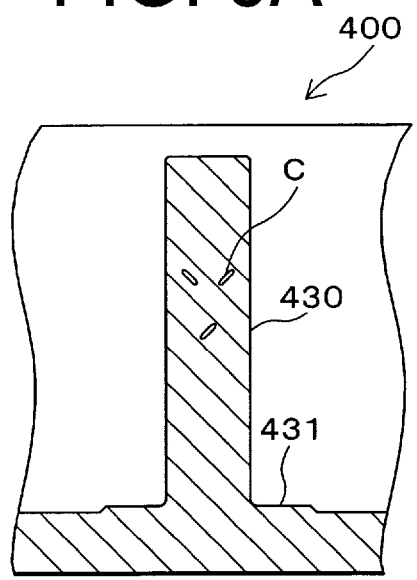 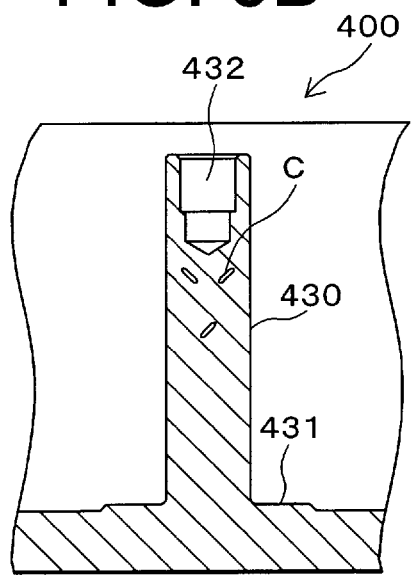

FIG. 6A
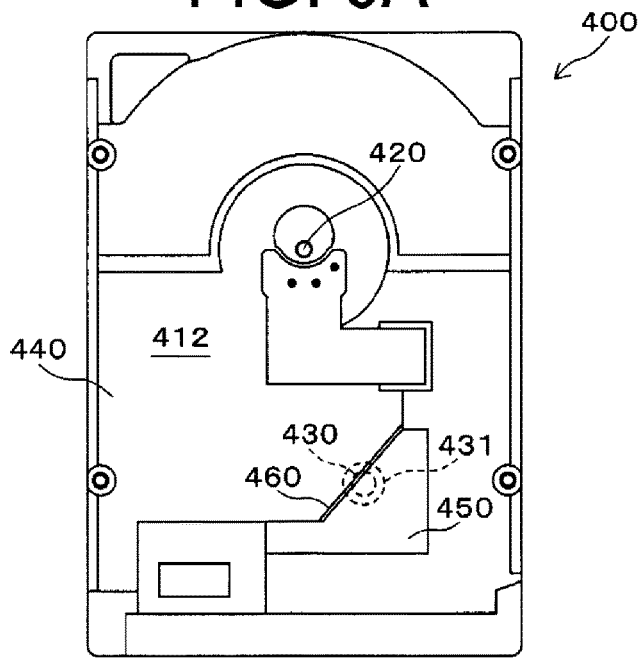
FIG. 6B
FIG. 6C
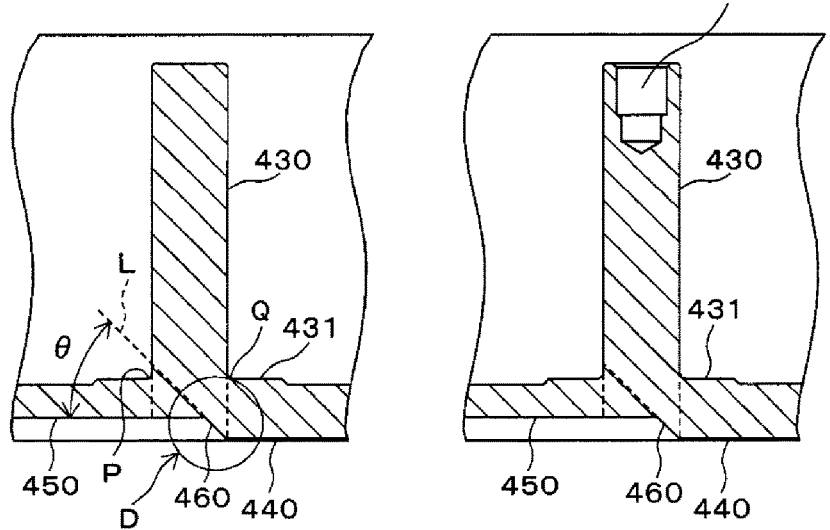
FIG. 6D
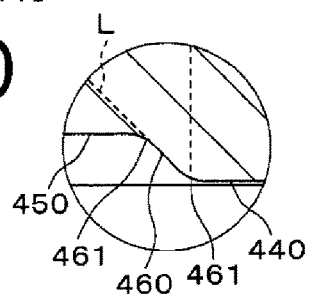

US 11,456,012 B1

BASE MEMBER, SPINDLE MOTOR, AND HARD DISK DRIVE DEVICE

CROSS-REFERENCE TO RELATED APPLICATIONS

This application claims the benefit of priority to Japanese Patent Application Number 2021-101499 filed on Jun. 18, 2021. The entire contents of the above-identified application are hereby incorporated by reference.

TECHNICAL FIELD

The disclosure relates to a base member for an electronic device such as a hard disk drive device, and in particular, relates to a technique that reduces cavities in a protrusion used to attach a component and that protrudes from the base member.

BACKGROUND

The base member of a spindle motor in a hard disk drive device is formed by casting. In a hard disk drive device in which helium is sealed inside the device, a protrusion used to assemble a pivot bearing unit is formed integrally with the base member from the viewpoint of preventing helium from leaking (see US 2016/365105).

The base member described above is typically formed by die casting. In the upper half of a die cast mold, a recess (blind hole) corresponding to the shape of the protrusion is formed. In a case where a molten metal does not sufficiently reach the inside of the blind hole, a hole (cavity) is generated in the formed item. This may lead to decreased stiffness of the protrusion. In contrast, JP 2019-8856 A describes that a blind hole corresponding to the shape of the protrusion is formed in the mold upper half, and a protrusion is formed at a location on the mold lower half corresponding to the blind hole. This enables molten metal that has passed over the protrusion to move toward the blind hole, making it possible to reduce cavity formation.

SUMMARY

With the technique described above, however, the molten metal is expected to flow around the periphery of the protrusion of the mold lower half, and there is a possibility that the molten metal does not move toward the blind hole. The present inventor performed an experiment and confirmed that, in a case where a protrusion similar to that described above is provided on the mold lower half, a cavity is formed in the protrusion at a higher percentage than that in a case where such a protrusion is not provided.

The disclosure has been made in view of the situation described above, and an object thereof is to provide a base member that can reduce cavity formation in a protrusion. Another object of the disclosure is to provide a spindle motor and a hard disk drive device including such a base member.

The disclosure provides a base member of a spindle motor including an upper surface and a lower surface, in which the base member is a casting, the upper surface includes a protrusion extending upward, the lower surface includes a first lower surface and a second lower surface positioned higher than the first lower surface, the first lower surface and the second lower surface are adjacent to each other with a stepped portion interposed between the first lower surface and the second lower surface, the stepped portion increasing in height from the first lower surface to the second lower surface, the stepped portion has a uniform height difference, and when a tangential line is drawn to the stepped portion in a cross section passing through a central axis of the protrusion and extending perpendicular to the stepped portion in plan view, the tangential line extends through between a lower edge point of an outer periphery of the protrusion on a side of the second lower surface and a lower edge point of the outer periphery of the protrusion on a side of the first lower surface.

In the casting of the base member having the configuration described above, the tangential line drawn to the stepped portion extends through between the lower edge point of the outer periphery of the protrusion on the second lower surface side and the lower edge point of the outer periphery of the protrusion on the first lower surface side. Thus, once the molten metal reaches the portion of the mold that forms the stepped portion, the molten metal flows in the direction of the protrusion. Here, in the disclosure, the stepped portion has a uniform height difference. Thus, as compared with JP 2019-8856 A, the amount of flowing molten metal that deviates from the direction of the protrusion is small. Thus, a sufficient amount of molten metal flows in the direction of the protrusion, and it is possible to suppress cavity formation in the protrusion.

According to the disclosure, it is possible to suppress cavity formation in the protrusion of the base member, and this makes it possible to maintain stiffness of the protrusion.

BRIEF DESCRIPTION OF DRAWINGS

FIG. 4A is a plan view and FIG. 4B is a rear view.

FIG. 5A is a partial cross-sectional view illustrating a state of a typical base member after casting, and FIG. 5B is a partial cross-sectional view illustrating a state after finishing.

FIG. 6A to FIG. 6D are diagrams illustrating the base member according to the first embodiment of the disclosure, where FIG. 6A is a rear view, FIG. 6B is a partial cross-sectional view illustrating a state after casting, FIG. 6C is a partial cross-sectional view illustrating a state after finishing, and FIG. 6D is an enlarged view illustrating a portion indicated by the arrow D in FIG. 6B.

DESCRIPTION OF EMBODIMENTS

[1] First Embodiment

1. Hard Disk Drive Device

Figure 1:
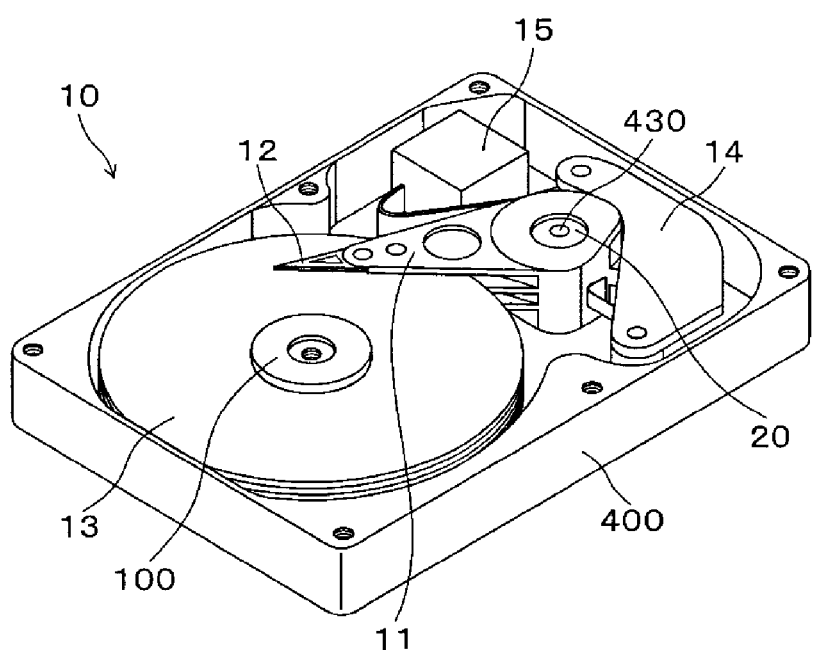
FIG. 1 is a perspective view illustrating a hard disk drive device according to a first embodiment of the disclosure.
Figure 2:
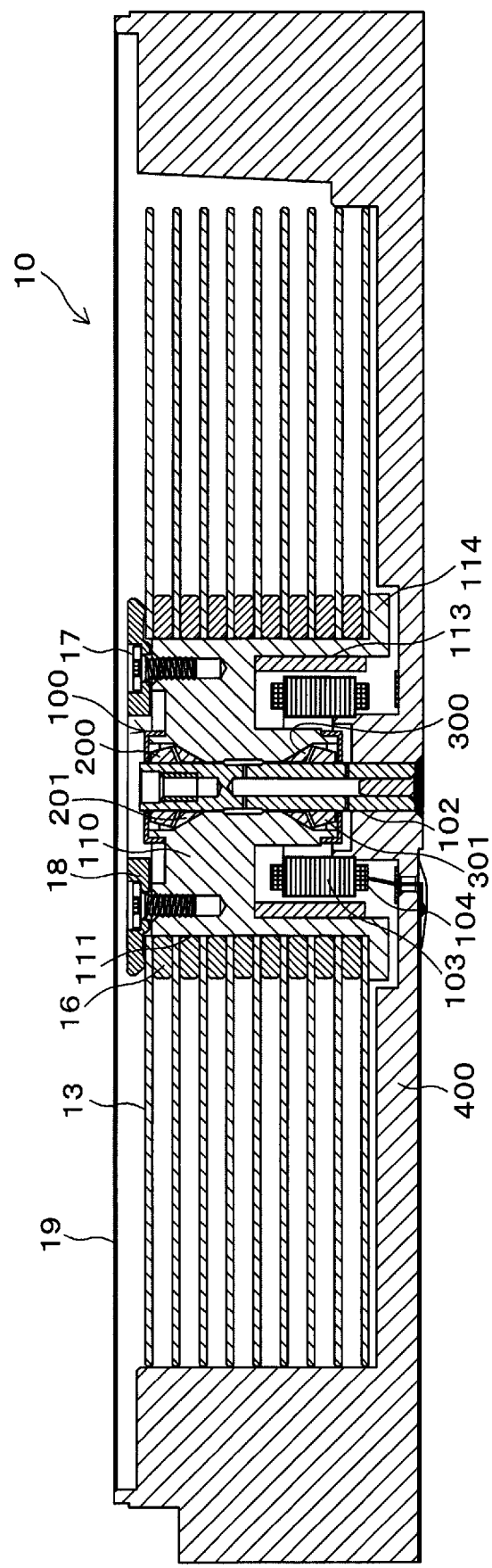
FIG. 2 is a cross-sectional view illustrating the hard disk drive device according to the first embodiment of the disclosure.

FIG. 1 is a perspective view schematically illustrating the entire configuration of a hard disk drive device 10 according to a first embodiment of the disclosure. FIG. 2 is a cross-sectional view of the hard disk drive device 10 taken along a plane including the axis of rotation. The hard disk drive device 10 includes, in a base member 400, a spindle motor 100 and a plurality of hard disks 13 attached to the spindle motor 100 to rotate. The hard disk drive device 10 also includes a swing arm 11 configured to support a plurality of magnetic heads 12 each facing a respective hard disk 13, an actuator 14 configured to drive the swing arm 11, and a control unit 15 configured to control these units. The swing arm 11 is supported through a pivot assembly bearing 20 by a pin portion 430 provided integrally with the base member 400 so as to stand at the base member 400.

2. Spindle Motor

Figure 3:
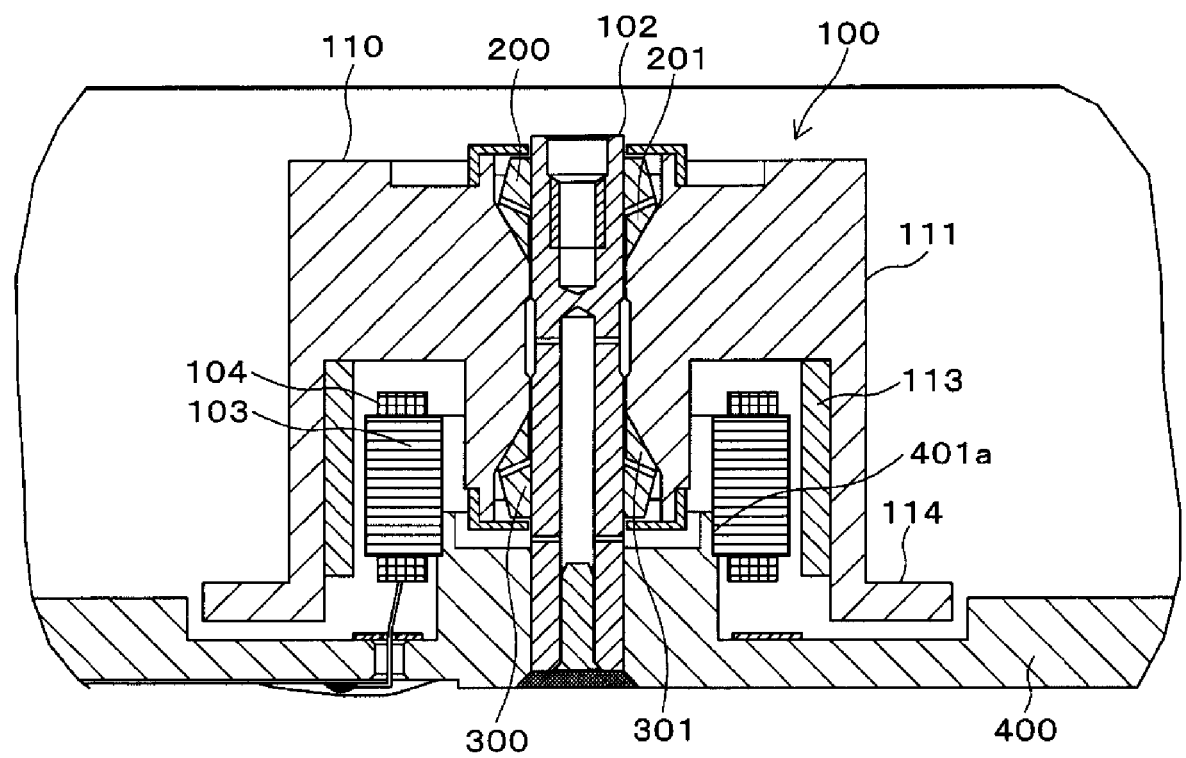
FIG. 3 is a cross-sectional view illustrating a spindle motor according to the first embodiment of the disclosure.

FIG. 3 is a cross-sectional view illustrating the spindle motor 100 according to an embodiment, taken along a plane including the axis of rotation. The spindle motor 100 includes the base member 400 and a shaft 102 fixed to the base member 400. At the shaft 102, conical bearing members 201 and 301 are fixed so as to be spaced apart from each other in the axial direction to constitute bearings 200 and 300, respectively. In addition, a tubular portion 401a extending upward in the axial direction of the shaft 102 is formed on the base member 400. A stator core 103 is fixed at an outer periphery of the tubular portion 401a. The stator core 103 is formed by layering, in the axial direction, a plurality of thin sheet-like soft magnetic materials (for example, electromagnetic steel sheets) each having an annular shape, and includes a plurality of pole teeth protruding outward in the radial direction. The plurality of pole teeth are provided at equal intervals along a circumferential direction, and a coil 104 is wound around each pole teeth.

The spindle motor 100 includes a rotor 110. The rotor 110 includes a tubular portion 111. A rotor magnet 113 having an annular shape is fixed to the inner peripheral surface side of the tubular portion 111. The rotor magnet 113 is magnetized in a manner such that adjacent portions alternately have opposing magnetic poles such as S-N-S-N . . . along a circumferential direction. The inner periphery of the rotor magnet 113 faces the outer periphery of the pole teeth of the stator core 103 in a state of being spaced apart from each other. In addition, when the coil 104 is supplied with a drive current, a drive force that causes the rotor magnet 113 to rotate is generated, and the rotor 110 rotates relative to the shaft 102 and the base member 400 with the shaft 102 serving as an axis. This mechanism is similar to that of a typical spindle motor.

A flange portion 114 extending outward in the radial direction is formed at a peripheral edge of a lower end portion of the tubular portion 111. The flange portion 114 functions as a disk mounting portion on which the plurality of hard disks 13 are stacked and mounted. As illustrated in FIG. 2, the hard disks 13 are stacked on the flange portion 114, and a total of nine hard disks 13 are sequentially stacked with spacers 16 interposed between the hard disks 13. Note that the number of hard disks 13 may be 10 or more. In addition, the uppermost hard disk 13 is fixed to the rotor 110 by using a clamp 18 attached to the upper surface of the rotor 110 using a screw 17. Note that, in FIG. 2, reference symbol 19 represents a cover.

3. Configuration of Base Member

Figure 4A:
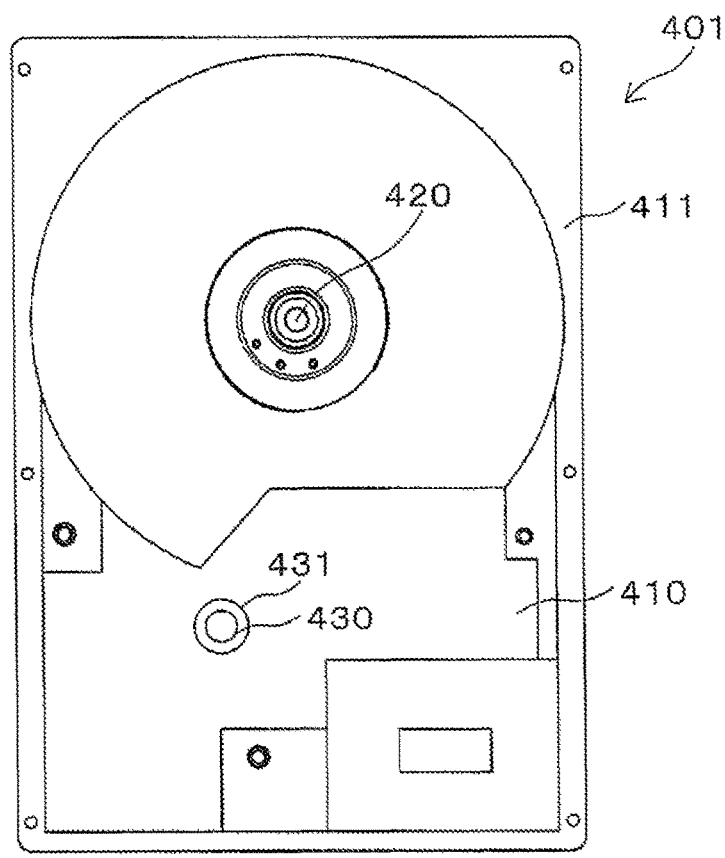
FIG. 4A and FIG. 4B illustrate a typical base member, where
Figure 4B:
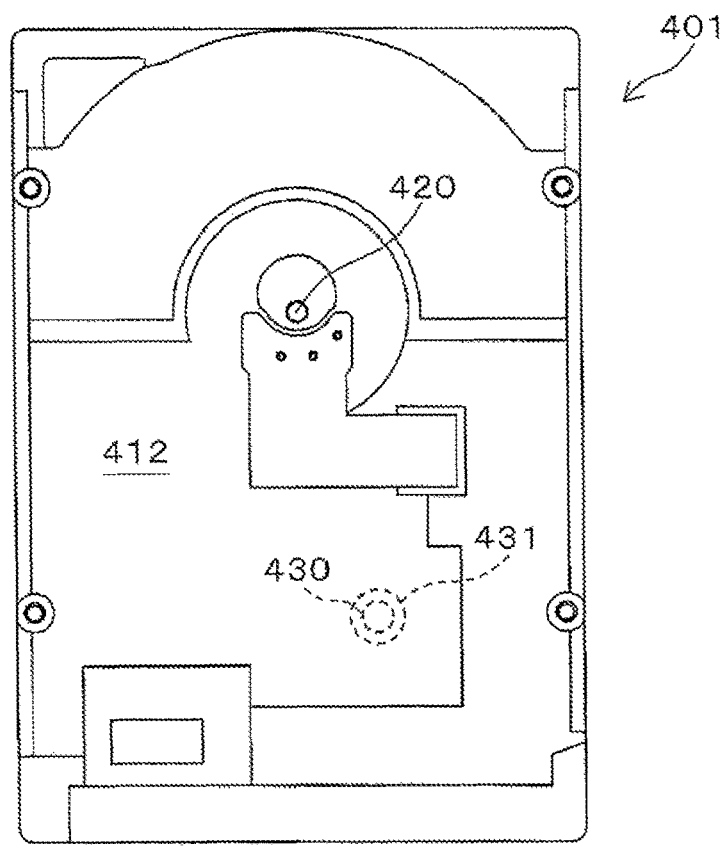

A base member according to the first embodiment of the disclosure will be described with reference to the drawings. Prior to description of the embodiment, description will be made of a typical base member 401 serving as the basis of development of the disclosure. FIG. 4A is a plan view of the base member 401, and FIG. 4B is a rear view. The base member 401 is manufactured by die casting aluminum. At the time of casting, molten metal is poured from a gate provided in the die cast mold in a direction from above to below in the drawing. In the drawing, the reference symbol 410 represents a bottom portion, and the bottom portion 410 has a rectangular plate shape having short sides and long sides. A side wall portion 411 extending in a direction perpendicular to the bottom portion 410 is formed around the entire periphery of the bottom portion 410.

A through hole 420 is formed at a position slightly above a horizontally central portion of the bottom portion 410. The shaft 102 of the spindle motor 100 is inserted into and fixed at the through hole 420. In addition, the pin portion (protrusion) 430 is formed at a position slightly lower than and left of the bottom portion 410. A seat face 431 having a height slightly higher than the region around the seat face 431 is formed around the pin portion 430. The pivot assembly bearing 20 described above is mounted on this seat face 431. Furthermore, a screw hole 432 used to attach the pivot assembly bearing 20 is formed at the upper end portion of the pin portion 430, as illustrated in FIG. 5B.

The base member 400 having the configuration described above is cast using a die cast mold. FIG. 5A illustrates the base member 400 after casting, and FIG. 5B illustrates a state where, after casting, the outer diameter of the pin portion 430, the upper surface of the seat face 431, and the screw hole 432 have been subjected to finishing. As illustrated in these drawings, a plurality of cavities C are formed in the pin portion 430. The present embodiment reduces these cavities C.

Next, the base member 400 according to the first embodiment of the disclosure will be described with reference to FIG. 6A to FIG. 6D. In the following description, the same reference symbols are assigned to constituent elements equivalent to the constituent elements illustrated in FIG. 4A to FIG. 5B, and explanation thereof will not be repeated. The base member 400 has a configuration similar to that of the upper surface of the typical base member 401 illustrated in FIG. 4A. A lower surface 412 of the base member 400 includes a first lower surface 440 having the same height as the height of the lower surface 412, and a second lower surface 450 positioned higher than the first lower surface 440. In other words, in FIG. 6A, the second lower surface 450 is recessed relative to the first lower surface 440. The first lower surface 440 and the second lower surface 450 are disposed adjacent to each other with a stepped portion 460 interposed between the first lower surface 440 and the second lower surface 450. The stepped portion 460 has a height gradually increasing from the first lower surface 440 to the second lower surface 450.

The stepped portion 460 has a straight line shape in plan view and diagonally (at approximately 45° in this example) traverses between the first lower surface 440 and the second lower surface 450. In addition, the stepped portion 460 overlaps with a portion extending from the outer periphery to the inner peripheral side of the pin portion 430 in plan view. In addition, the stepped portion 460 has a uniform height difference from the first lower surface 440 to the second lower surface 450. FIG. 6B and FIG. 6C illustrate a cross section passing through a central axis of the pin portion 430 and extending perpendicular to the stepped portion 460 in plan view. A tangential line L touching the stepped portion 460 forms a predetermined angle θ (in this example, θ is 45° relative to the second lower surface 450) from the first lower surface 440 to the second lower surface 450 such that the stepped portion 460 is configured as a flat sloped surface. In this cross section, the tangential line L of the stepped portion 460 extends through between a lower edge point P of the outer periphery surface of the pin portion 430 on the second lower surface 450 side and a lower edge point Q of the outer periphery surface of the pin portion 430 on the first lower surface 440 side.

Here, in order to more effectively suppress cavity formation in the pin portion 430, the angle formed by the tangential line L and the second lower surface 450 is preferably set to from to 15° to 90°, more preferably from 30° to 60°.

FIG. 6B and FIG. 6C illustrate examples in a case where the stepped portion 460 has a flat surface. However, in a case where both end portions of the stepped portion 460 each have an arc-shaped portion 461 as illustrated in FIG. 6D, the stepped portion 460 is configured so that the tangential line L drawn at the stepped portion 460 extends through between the lower edge point P of the outer periphery surface of the pin portion 430 on the second lower surface 450 side and the lower edge point Q of the outer periphery surface of the pin portion 430 on the first lower surface 440 side. In the example of FIG. 6D, the arc-shaped portion 461 is formed at both end portions of the stepped portion 460 in the width direction. In this case, the tangential line L drawn at the stepped portion 460 is 45° relative to the second lower surface 450, and the tangential line L extends through between the lower edge point P of the outer peripheral surface of the pin portion 430 on the second lower surface 450 side and the lower edge point Q of the outer peripheral surface of the pin portion 430 on the first lower surface 440 side.

4. Operation and Effects of First Embodiment

During casting of the base member 400 having the configuration described above, molten metal flows, in a die cast mold, from the upper side to the bottom side in FIG. 6A and flows from the right side to the left side in FIG. 6B and FIG. 6C. The molten metal flows from the upper side in FIG. 6A. Once the molten metal reaches the portion that forms the stepped portion 460 in the die cast mold, the molten metal flows along the slope of the die cast mold in the direction of the tangential line L (direction toward a blind hole). In the present embodiment, the stepped portion 460 has a uniform height difference. This achieves a reduction in the amount of molten metal flowing in a direction departing from the direction of the blind hole for forming the pin portion 430, as compared with JP 2019-8856 A. Thus, a sufficient amount of molten metal flows in the direction of the blind hole. This makes it possible to suppress cavity formation in the pin portion 430. Thus, it is possible to maintain the stiffness of the pin portion 430.

In particular, in the embodiment described above, the stepped portion 460 has a straight line shape and does not protrude in the direction of flow of the molten metal. Thus, the molten metal is not pushed aside, and smoothly travels up the slope of the die cast mold to flow in the direction of the blind hole. This makes it possible to supply a more sufficient amount of molten metal to the blind hole, and to effectively suppress cavity formation.

5. Modification Example of Stepped Portion

Figure 7A:
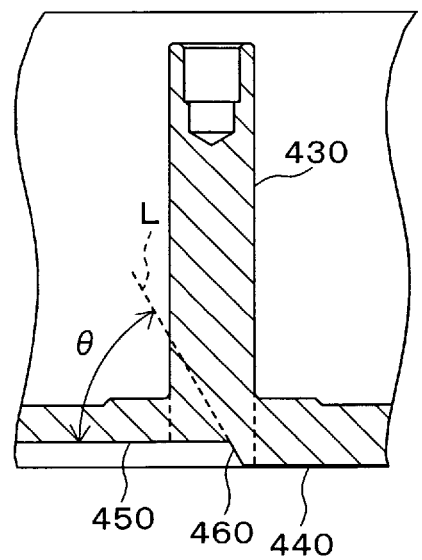
FIG. 7A to FIG. 7C are partial cross-sectional views illustrating a modification example of the first embodiment.
Figure 7B:
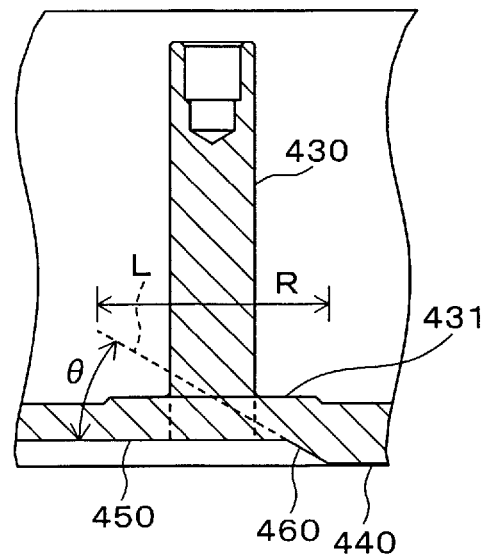
Figure 7C:
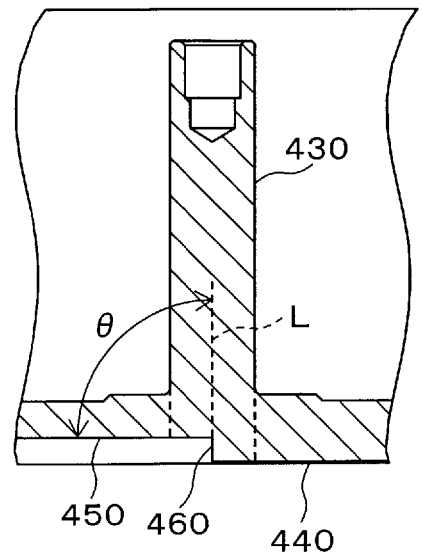

FIG. 7A to FIG. 7C illustrate a modification example of the stepped portion 460 according to the embodiment described above. FIG. 7A illustrates an example in which the angle θ of the tangential line L of the stepped portion 460 relative to the second lower surface 450 is larger than that in the embodiment described above, and FIG. 7B illustrates an example in which the angle θ of the tangential line L of the stepped portion 460 relative to the second lower surface 450 is smaller than that in the embodiment described above. In both of these examples, the tangential line L of the stepped portion 460 passes through the outer peripheral surface of the pin portion 430. Thus, in these examples also, it is possible to obtain operation and effects equivalent to those of the embodiment described above.

FIG. 7C illustrates an example in which the angle θ of the tangential line L of the stepped portion 460 relative to the second lower surface 450 is set to 90°. In this example, the tangential line L of the stepped portion 460 extends through the upper end surface of the pin portion 430. With this example also, it is possible to obtain operation and effects equivalent to the embodiment described above.

Here, in the example illustrated in FIG. 7B, the stepped portion 460 is located outside the pin portion 430 when viewed in plan view. In the disclosure, when a circular region having the pin portion 430 located at its center in plan view and having a diameter three times larger than the diameter of the pin portion 430 is set as a pin-portion neighboring region (protrusion neighboring region) R, a preferred mode is configured such that the stepped portion 460 at least partially overlaps with the pin-portion neighboring region R in a vertical direction (in the axial direction). In the example illustrated in FIG. 7B, a portion of the stepped portion 460 overlaps with the pin-portion neighboring region R in the vertical direction in plan view.

In the example illustrated in FIG. 7B, the molten metal also flows along the slope of the die cast mold toward the direction of the tangential line L, in other words, flows toward the direction of the pin portion 430. This makes it possible to obtain operation and effects equivalent to those of the embodiment described above.

[2] Second Embodiment

1. Configuration of Base Member

Figure 8A:
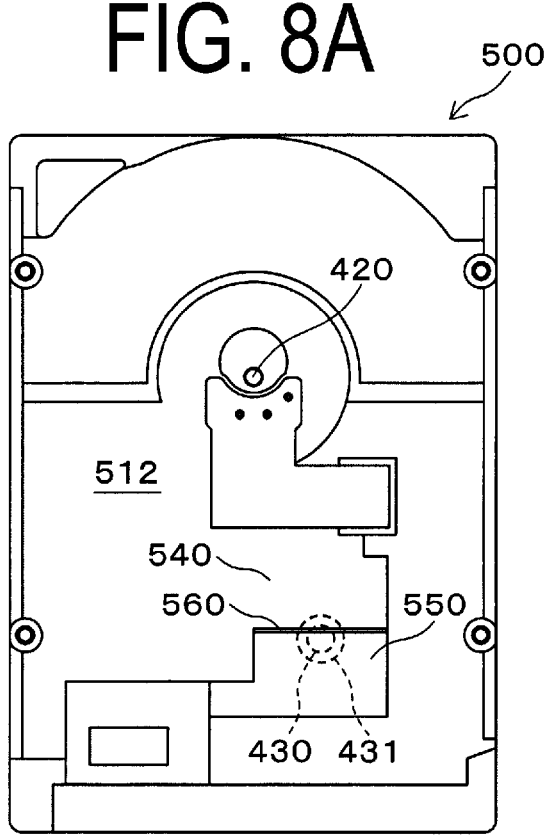
FIG. 8A is a rear view illustrating a base member according to a second embodiment of the disclosure.

FIG. 8A is a diagram illustrating a second embodiment of the disclosure. In the drawing, the reference number 500 represents a base member according to the second embodiment. A lower surface 512 of the base member 500 includes a first lower surface 540 having the same height as the height of the lower surface 512, and a second lower surface 550 positioned higher than the first lower surface 540. In other words, in FIG. 8A, the second lower surface 550 is recessed relative to the first lower surface 540.

The second lower surface 550 positioned higher than the first lower surface 540 is formed so as to be adjacent to the first lower surface 540. In other words, in FIG. 8A, the second lower surface 550 is recessed relative to the first lower surface 540. The first lower surface 540 and the second lower surface 550 are disposed adjacent to each other with a stepped portion 560 interposed between the first lower surface 540 and the second lower surface 550. The stepped portion 560 has a height gradually increasing from the first lower surface 540 to the second lower surface 550.

The stepped portion 560 traverses between the first lower surface 540 and the second lower surface 550 in a traverse direction (direction parallel to a short side of the base member 500) as a straight line, and overlaps, in plan view, with a portion slightly shifted from the outer periphery of the pin portion 430 toward the inner peripheral side. In addition, the stepped portion 560 has a uniform height difference from the first lower surface 540 to the second lower surface 550.

2. Operation and Effects of Second Embodiment

In the base member 500 having the configuration described above, the stepped portion 560 traverses across the first lower surface 540 and the second lower surface 550 in a direction parallel to the short side of the base member 500. This causes the molten metal poured from the upper side of the base member 500 to flow in at a right angle relative to the slope that forms the stepped portion 560 in the die cast mold. Thus, the molten metal passing through the slope that forms the stepped portion 560 in the die cast mold and traveling toward the blind hole is supplied directly to the blind hole without deviating in the horizontal direction. This makes it possible to effectively suppress cavity formation in the pin portion 430.

3. Modification Example of Stepped Portion

Figure 8B:
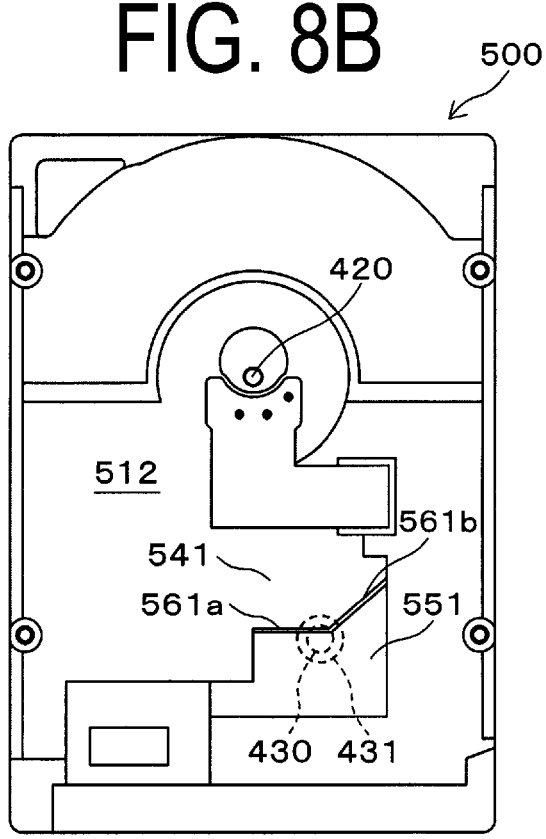
FIG. 8B is a rear view illustrating a modification example of FIG. 8A.

FIG. 8B is a diagram illustrating a modification example of the second embodiment described above. In this modification example, the first lower surface 541 and the second lower surface 551 are disposed adjacent to each other with a stepped portion 561 bent in plan view interposed between the first lower surface 541 and the second lower surface 551. In other words, the first lower surface 541 and the second lower surface 551 are disposed adjacent to each other with the stepped portion 561 interposed between the first lower surface 541 and the second lower surface 551. The stepped portion 561 is bent in a shape protruding toward the pin portion 430 (in a direction from the first lower surface 541 toward the second lower surface 551) in plan view. The stepped portion 561 includes a first stepped portion 561a extending from a left side edge of the first lower surface 541 to the vicinity of the outer periphery of the pin portion 430 in plan view and being parallel to a short side of the base member 500, and also includes a second stepped portion 561b bent upward at the end portion of the first stepped portion 561a and reaching a right side edge of the first lower surface 541. The first stepped portion 561a overlaps with a portion extending from the outer periphery to the inner peripheral side of the pin portion 430. The second stepped portion 561b extends diagonally upward from the outer periphery of the pin portion 430.

The base member 500 having the configuration described above provides operation and effects equivalent to those of the second embodiment described above. In addition, some of the molten metal flowing into the portion that forms the second stepped portion 561b in the die cast mold flows in a direction of the blind hole along the slope of the second stepped portion 561b. This leads to an increase in the amount of molten metal supplied to the blind hole, and more effectively suppresses cavity formation in the pin portion 430.

Figure 8C:
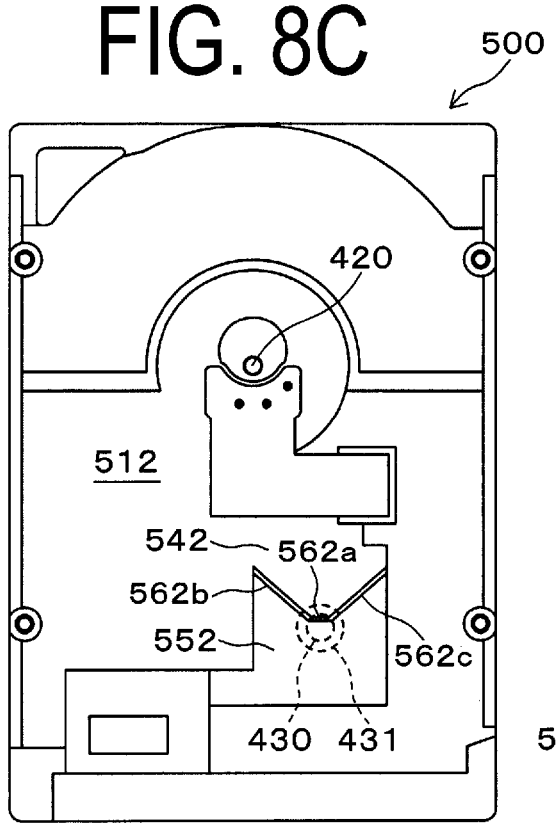
FIG. 8C is a rear view illustrating another modification example of FIG. 8A.

FIG. 8C is a diagram illustrating another modification example of the second embodiment described above. In the case of this modification example, a first lower surface 542 and a second lower surface 552 are disposed adjacent to each other with a stepped portion 562 interposed between the first lower surface 542 and the second lower surface 552. The stepped portion 562 is bent in a shape protruding toward the pin portion 430 (in a direction from the first lower surface 542 toward the second lower surface 552) in plan view. The stepped portion 562 includes a first stepped portion 562a extending from the vicinity of the outer periphery of the pin portion 430 in plan view and in parallel to a short side of the base member 500, reaching the vicinity of the outer periphery of the pin portion 430. The stepped portion 562 also includes a second stepped portion 562b bent upward at one end portion of the first stepped portion 562a and reaching a left side edge of the first lower surface 542, and a third stepped portion 562c bent upward at the other end portion of the first stepped portion 562a and reaching a right side edge of the first lower surface 542. The first stepped portion 562a overlaps with a portion extending from the outer periphery to the inner peripheral side of the pin portion 430. The second and third stepped portions 562b and 562c each extend diagonally upward from the outer periphery of the pin portion 430.

The base member 500 having the configuration described above provides operation and effects equivalent to those of the second embodiment described above. In addition, molten metal flowing into the portion that forms the second and third stepped portions 562b and 562c in the die cast mold flows in a direction of the blind hole along the slopes of the second and third stepped portions 562b and 562c. Thus, the amount of molten metal supplied to the blind hole further increases. This makes it possible to much more effectively suppress cavity formation in the pin portion 430.

[3] Third Embodiment

1. Configuration of Base Member

Figure 9A:
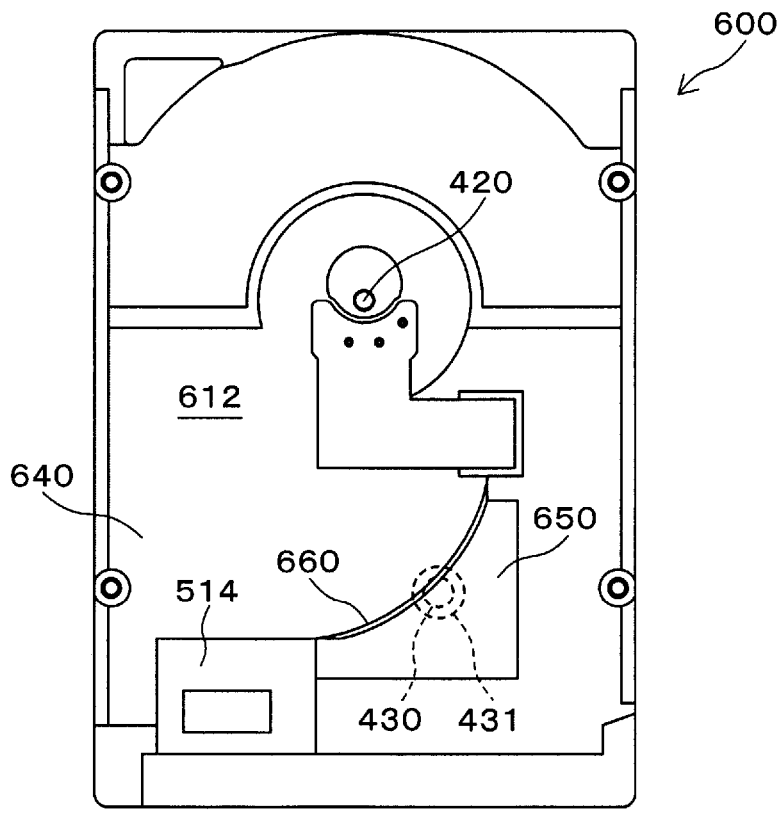
FIG. 9A is a rear view illustrating a base member according to a third embodiment of the disclosure.

FIG. 9A is a diagram illustrating a third embodiment of the disclosure. In the drawing, the reference symbol 600 represents a base member according to the third embodiment. The base member 600 includes a lower surface 612. A rectangular recessed portion 514 is formed at a left lower portion of the lower surface 612. An arc shaped stepped portion 660 extending upward from a right upper corner portion of the recessed portion 514 is formed. The left side of the stepped portion 660 is a first lower surface 640. In this embodiment also, the first lower surface 640 and the second lower surface 650 are disposed adjacent to each other with the stepped portion 660 interposed between the first lower surface 640 and the second lower surface 650. The stepped portion 660 is bent in a shape protruding toward the pin portion 430 (in a direction from the first lower surface 640 toward the second lower surface 650) in plan view.

A second lower surface 650 positioned higher than the first lower surface 640 is formed so as to be adjacent to the first lower surface 640. In other words, in FIG. 9A, the second lower surface 650 is recessed relative to the first lower surface 640. The first lower surface 640 and the second lower surface 650 are adjacent to each other with a stepped portion 660 interposed between the first lower surface 640 and the second lower surface 650. The stepped portion 660 has a height gradually increasing from the first lower surface 640 to the second lower surface 650.

The stepped portion 660 traverses between the first lower surface 640 and the second lower surface 650 in the shape of a rightward upward-sloping arc. The central portion thereof overlaps, in plan view, with a portion slightly shifted from the outer periphery toward the inner peripheral side of the pin portion 430. In addition, the stepped portion 660 has a uniform height difference from the first lower surface 640 to the second lower surface 650.

2. Operation and Effects of Third Embodiment

In the case of the base member 600 having the configuration described above, once molten metal is poured into a die cast mold, some of the molten metal flows from a right end portion of the stepped portion 660 along the stepped portion 660 in the portion that forms the stepped portion 660 in the die cast mold. Then, when the molten metal flows at or around the center of the portion that forms the stepped portion 660, the molten metal flows beyond the portion that forms the stepped portion 660 and is supplied to the blind hole. This makes it possible to effectively suppress cavity formation in the pin portion 430.

In particular, with the embodiment described above, the stepped portion 660 traverses between the first lower surface 640 and the second lower surface 650 in the shape of a rightward upward-sloping arc. Thus, when the pivot assembly bearing 20 is attached to the protrusion 430, it is possible to ensure the stiffness of the protrusion 430 and the base member 600. That is, the swing arm 11 supported by the pivot assembly bearing 20 swings in a diagonally upper left region of the protrusion 430 with the protrusion 430 being the axis of center, and the protrusion 430 is subject to inertial force in the swinging direction. In the embodiment described above, the thick first lower surface 640 is provided along the direction of the inertial force. This makes it possible to suppress deformation of the first lower surface 640 and the protrusion 430. A similar effect can be achieved with the first embodiment illustrated in FIG. 6A and a modification example illustrated in FIG. 9B described later.

3. Modification Example of Stepped Portion

Figure 9B:
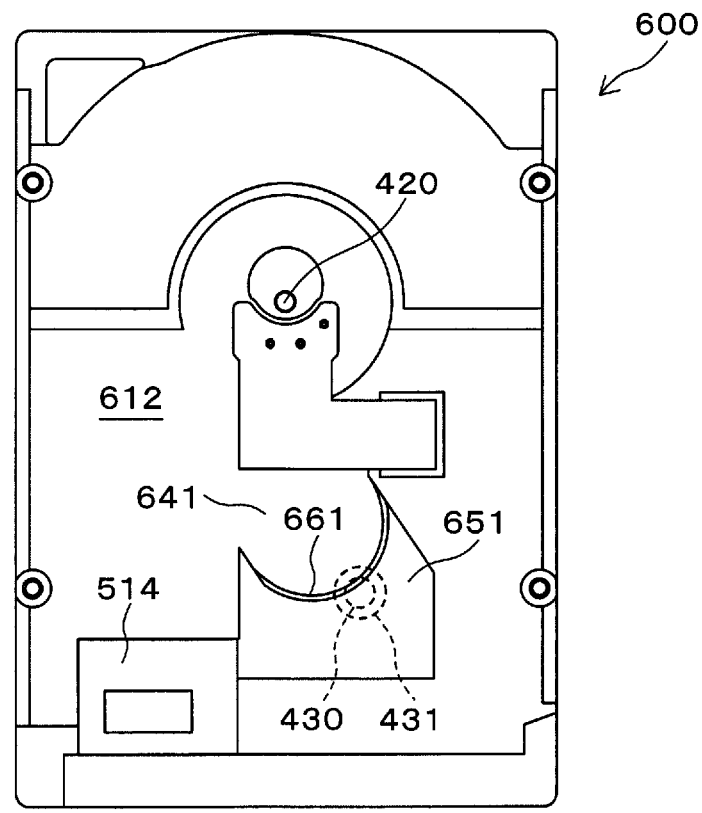
FIG. 9B is a rear view illustrating a modification example of FIG. 9A.

FIG. 9B is a diagram illustrating a modification example of the third embodiment described above. In this modification example, a stepped portion 661 has a semicircle shape protruding toward the pin portion 430 from a right end portion of the stepped portion 660 illustrated in FIG. 9A. A first lower surface 641 and a second lower surface 651 are disposed so as to be adjacent to each other with the stepped portion 661 interposed between the first lower surface 641 and the second lower surface 651. The stepped portion 661 is bent in a shape protruding toward the pin portion 430 (in a direction from the first lower surface 641 toward the second lower surface 651) in plan view. The radius of curvature of this stepped portion 661 is set to be the outer diameter of the pin portion 430 or greater.

The central portion of the stepped portion 661 overlaps with a portion slightly shifted from the outer periphery toward the inner peripheral side of the pin portion 430 in plan view. In addition, the stepped portion 661 has a uniform height difference from the first lower surface 641 to the second lower surface 651.

In the case of the base member 600 having the configuration described above, once molten metal is poured into a die cast mold, the molten metal flows from a portion that forms the stepped portion 661 in the die cast mold and gathers at the central portion thereof, and moves beyond the portion that forms the stepped portion 661 to be supplied to the blind hole. This makes it possible to effectively suppress cavity formation in the pin portion 430.

Note that, in the base member 600 described above, the stepped portion 661 has an arc shape protruding toward the right bottom direction in plan view. However, it may be possible to employ a configuration having an arc shape protruding directly downward such that the central portion of the stepped portion 661 overlaps with the outer periphery of the pin portion 430. In this case, the position of the right edge of the first lower surface 641 is shifted toward the right from the position indicated in FIG. 9B, and the first lower surface 641 and the second lower surface 651 are disposed so as to be continuous directly downward.

4. Modification Example of First Lower Surface

Figure 10:
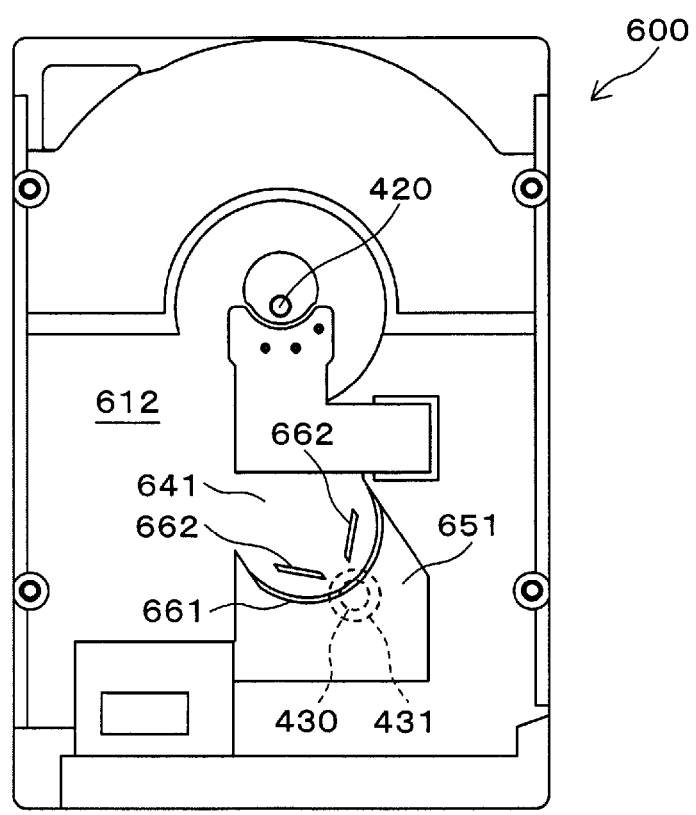
FIG. 10 is a rear view illustrating a modification example of the base member according to the third embodiment.

A modification example illustrated in FIG. 10 includes a pair of grooves 662 formed in the pin-portion neighboring region R illustrated in FIG. 7B of the first lower surface 641 of the base member 600 illustrated in FIG. 9B. The pair of grooves 662 are angled so as to be tapered toward the direction in which the stepped portion 661 protrudes.

In the case of the base member 600 having the configuration described above, projected portions for forming the grooves 662 are formed in the portion that forms the first lower surface 641 in the die cast mold. Thus, during casting, the molten metal flows along the projected portions, and gathers at the central portion of the stepped portion 662. This enables molten metal that has flowed beyond the portion that forms the stepped portion 662 to be supplied to the blind hole. This makes it possible to effectively suppress cavity formation in the pin portion 430.

[4] Other Modification Examples

The disclosure is not limited to the embodiments described above, and it is possible to make various modifications as described below.

i) The protrusion is not limited to the pin portion 430. For example, the disclosure can be applied to a case where a pin used to attach the actuator 14 or other parts in FIG. 1 is casted integrally with the base portion 400.

ii) The grooves 662 illustrated in FIG. 10 can be applied to all the base members 400 to 600 illustrated in FIG. 6A to FIG. 9B. In addition, the shape of the groove 662 as viewed from the back side is not limited to the straight shape and may be curved. Furthermore, the shape of the groove 662 is not limited to an elongated shape and may be a lancet shape.

iii) The cross-sectional shapes of the stepped portions 460, 560, 660, and 661, the first stepped portions 561a and 562a, the second stepped portions 561b and 562b, and the third stepped portion 562c can be any shape such as a convex surface, a concave surface, or a combination of these surfaces.

Examples

Next, the effects of the disclosure will be described by using specific examples.

The base member illustrated in FIG. 6A to FIG. 6D was manufactured as an example of the disclosure. In addition, the base member illustrated in FIG. 4A to FIG. 5B was manufactured as a first comparative example. Furthermore, as a second example, a base member was manufactured by forming a frustum-shaped recessed portion in a back surface of the pin portion of the base member serving as the first comparative example. The manufactured base members were cut along the axial direction along the outer periphery of the seat face of the base members to create test pieces. The test pieces were observed in a non-destructive manner using X-ray CT to calculate the percentage of the porosity volume relative to the volume of each of the test pieces. This was set as the porosity volume. Assuming that the porosity volume of the first comparative example is 1, the porosity volume of the example of the disclosure was 0.08, and the porosity volume of the second comparative example was 1.25. Based on the results described above, it was confirmed that, in the case of the base member according to the disclosure, cavities were reduced and stiffness was improved.

The disclosure can be used for an electronic device such as a spindle motor or a hard disk drive device, and a base member to be used in the same.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A base member of a spindle motor, comprising:
   an upper surface; and
   a lower surface, wherein
   the base member is a casting, and the upper surface and the lower surface are casting surfaces of the base member,
   the upper surface includes a protrusion that is integrally cast with the base member and extending upward,
   the lower surface includes a first lower casting surface and a second lower casting surface positioned higher than the first lower casting surface,
   the first lower casting surface and the second lower casting surface are adjacent to each other with a stepped portion interposed between the first lower casting surface and the second lower casting surface, the stepped portion increasing in height from the first lower casting surface to the second lower casting surface,
   the stepped portion has a uniform height difference, and
   when a tangential line is drawn to the stepped portion in a cross section passing through a central axis of the protrusion and extending perpendicular to the stepped portion in plan view, the tangential line extends through between a lower edge point of an outer periphery surface of the protrusion on the second lower casting surface side and a lower edge point of the outer periphery surface of the protrusion on the first lower casting surface side.

2. The base member according to claim 1, wherein
   the stepped portion has a straight line shape in plan view or has a protruding shape protruding toward the protrusion.

3. The base member according to claim 1, wherein
   an angle formed by the tangential line and the second lower casting surface falls within a range from 15° to 90°.

4. The base member according to claim 1, wherein
   an angle formed by the tangential line and the second lower casting surface falls within a range from 30° to 60°.

5. The base member according to claim 1, wherein,
   when a circular region having the protrusion at its center in plan view and having a diameter three times larger than a diameter of the protrusion is set as a protrusion neighboring region, the stepped portion at least partially overlaps with the protrusion neighboring region in a vertical direction.

6. The base member according to claim 5, wherein,
   a seat face having a height higher than a region around the seat face is provided around the protrusion and in the protrusion neighboring region in plan view, and
   the stepped portion at least partially overlaps with the seat face in the vertical direction.

7. The base member according to claim 5, wherein
   the stepped portion includes a straight portion having a substantially straight line shape in plan view, and
   the straight portion at least partially overlaps with the protrusion neighboring region in the vertical direction.

8. The base member according to claim 5, wherein
   the stepped portion includes a curved portion having a curve protruding toward a side of the protrusion in plan view, and
   the curved portion at least partially overlaps with the protrusion neighboring region in the vertical direction.

9. The base member according to claim 5, wherein
   a groove extending toward a side of the protrusion is formed in the protrusion neighboring region of the first lower casting surface.

10. A spindle motor comprising:
    the base member according to claim 1.

11. A hard disk drive device comprising:
    the spindle motor according to claim 10.

* * * * *